Nov. 14, 1939.  G. GOLDSTEIN  2,179,693

WELDING ELECTRODE

Filed Oct. 30, 1937

Inventor
George Goldstein
By
Blackmore, Spencer & Hück
Attorneys

Patented Nov. 14, 1939

2,179,693

UNITED STATES PATENT OFFICE 2,179,693

WELDING ELECTRODE

George Goldstein, Oshawa, Ontario, Canada, assignor to General Motors Corporation, Detroit, Mich., a corporation of Delaware Application October 30, 1937, Serial No. 171,882

3 Claims. (Cl. 219—4)

This invention relates to electric welding apparatus and more particularly to welding electrode in which one part thereof is movable with respect to another part.

In certain welding operations, for example, spot welding, it has been proposed to use an electrode that is pivotally mounted so that the pressure on the work may be equalized. Where an electrode is made of two parts that are pivotally connected and it is desired that the welding current pass through the connection considerable arcing may take place which has a highly deleterious effect on the life of the electrode. I have found that if a coating of mercury is applied to the adjacent or contacting faces of the movable parts, as, for example, the faces of a ball and socket connection, the life of a welding electrode is greatly increased. The mercury establishes a good electrical connection between the parts and also acts as a lubricant.

The objects of the invention are to provide an electrode of long life having parts that are movable with respect to each other; to provide an electrode having a movable tip whereby arcing is greatly reduced over that of previously known constructions; to provide an electrode having a freely movable tip whereby friction is reduced; to provide an electrode having a replaceable tip; and to provide an improved combination of electrode and cooling means. A specific object of my invention is to provide an electrode for welding machines in which parts thereof are connected by a ball and socket joint having better electrical contact and less friction than in previously known constructions.

Other objects and advantages of my invention will become more apparent as the description proceeds. Reference is herein made to the accompanying drawing in which.

Figures 1, 2:
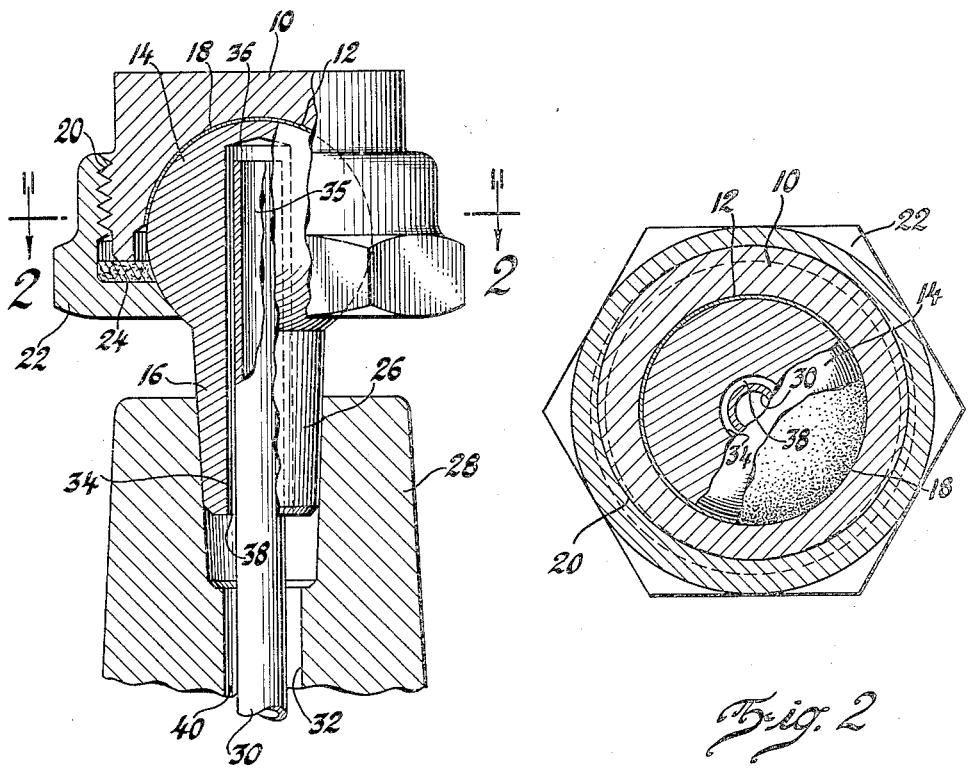
Figure 1 is a longitudinal view with parts in section showing one embodiment of my improved construction.
Figure 2 is a view taken substantially on line 2—2 in Figure 1.

In the drawing, 10 is an electrode tip having a socket 12 therein. The tip is formed of a suitable material for conducting electricity, as, for example, copper or alloys thereof such as "elkonite", etc. Within the socket 12 is the mating ball end 14 of a body 16.

Between the faces of the ball and socket is a coating of mercury 18. Either, or both, the ball and socket may have the mercury applied thereto. Preferably, also, in order to form a better electrical connection, the ball and socket are first lapped together. The contact faces may be cleaned with dilute nitric acid before applying the coating of mercury.

The tip has a screw threaded connection at 20 with a nut 22 which secures the tip to the ball end of the body 16. A gasket 24 of felt, or other suitable material, forms a yieldable seal between the two parts and retains the mercury between the mating faces of the ball and socket.

The body 16 has a tapered frictional connection 26 with an electrode holder 28. The reference numeral 30 indicates a tube which extends through an opening 32 in the electrode holder and into an opening 34 in the body 16. As seen in Figure 1, the open end 35 of the tube 30 is spaced a short distance from the closed end 36 of the opening 34. The closed end is separated from the central portion of the socket in the tip by a relatively thin portion of the ball end of member 14. Water, or other suitable cooling medium, may be forced through the tube 30 and out through the space 38 between the tube and walls of the opening 34 in the body 16 and then through the space 40 between the tube and walls of the opening 32. This provides an efficient means for cooling the several parts.

The body 16 and electrode holder may be formed of any suitable conductor of electricity, such as, copper, for example. The tip 10 may be made of a more expensive electrical conductor such as pure copper, or copper alloy such as "elkonite" which is an alloy containing copper and tungsten, while the body 16 may be made of less costly materials, if desired. However, even if both the tip and body are made of the more expensive materials, an economy is effected since only the tip when worn need be replaced.

The electrode holder 28 may be either movable or fixed as desired. If movable, it will be first brought into contact with the work, whereupon pressure will be applied to the work held between the pivoted electrode tip and a second electrode, not shown, as will be readily understood. The ball and socket joint permits the tip to move with respect to the body and equalize the pressure on the work during a welding operation. The mercury between the faces of the ball and socket forms a good electrical connection and also acts as a lubricant so that the tip may move with respect to the body without substantial friction. By means of the coating of mercury arcing between the tip and body caused by current flowing therethrough is substantially eliminated. The life of an electrode built in accordance with my invention is materially increased over previously known constructions.

Various changes and modifications may be made in the embodiment of my invention shown and described without departing from the spirit of my invention and I do not wish to limit the patent granted thereon except as necessitated by the prior art.

I claim:

1. A spot welding electrode comprising, a body and tip of conducting material movably secured together in pressure transmitting relation and a coating of mercury between the tip and body, said tip adapted to contact the work being spot welded.

2. A spot welding electrode comprising, a body and tip of conducting material having a ball and socket connection therebetween and a coating of mercury between the faces of the ball and socket.

3. In electric spot-welding apparatus, an electrode holder, a body of conducting material connected to said holder, a tip of conducting material for contacting the work, a ball and socket connection between the tip and body, and a coating of mercury between adjacent faces of the ball and socket whereby friction is reduced and a good electrical contact is maintained at all times during movement of the tip with respect to the body.

GEORGE GOLDSTEIN.